(12) United States Patent
Tan

(10) Patent No.: US 10,639,993 B2
(45) Date of Patent: May 5, 2020

(54) VEHICLE SHADE ASSEMBLY

(71) Applicant: Nissan North America, Inc., Franklin, TN (US)

(72) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 62 days.

(21) Appl. No.: 15/383,565

(22) Filed: Dec. 19, 2016

(65) Prior Publication Data

US 2018/0170181 A1  Jun. 21, 2018

(51) Int. Cl.
*B60J 7/00* (2006.01)
*B60N 2/00* (2006.01)
*B60N 2/22* (2006.01)
*B60N 2/02* (2006.01)
*B60K 35/00* (2006.01)

(52) U.S. Cl.
CPC .............. *B60K 35/00* (2013.01); *B60J 7/0015* (2013.01); *B60N 2/002* (2013.01); *B60N 2/22* (2013.01); *B60K 2370/152* (2019.05); *B60K 2370/67* (2019.05); *B60K 2370/771* (2019.05); *B60N 2002/0272* (2013.01); *G09G 2340/04* (2013.01); *G09G 2340/0492* (2013.01)

(58) Field of Classification Search
CPC ....... G09G 2340/04; G09G 2340/0492; B60K 35/00; B60K 2350/106; B60K 2350/922; B60K 2350/352; B60K 2350/1072; B60K 2370/771; B60K 2370/67; B60K 2370/152; B62D 25/06; B60N 2/20; B60N 2/002; B60N 2/22; B60N 2002/0272; B06T 3/20; B60J 7/0015; B60R 1/00; B60R 2300/207
See application file for complete search history.

(56) References Cited

U.S. PATENT DOCUMENTS

| | | | |
|---|---|---|---|
| 6,733,133 B2 | 5/2004 | Egle et al. | |
| 8,231,165 B2 | 7/2012 | Demma | |
| 9,184,778 B2 | 11/2015 | Tan | |
| 9,244,462 B2 | 1/2016 | Pedersen | |
| 9,248,819 B1 | 2/2016 | Tan | |
| 9,404,761 B2 | 8/2016 | Meuleau | |
| 9,507,345 B2 | 11/2016 | Takamatsu | |
| 2003/0090133 A1* | 5/2003 | Nathan | B60N 2/002 297/217.3 |

(Continued)

FOREIGN PATENT DOCUMENTS

JP  01-245287 A  9/1989

*Primary Examiner* — Brent D Castiaux
(74) *Attorney, Agent, or Firm* — Global IP Counselors, LLP

(57) ABSTRACT

A vehicle shade assembly includes a vehicle body structure, a cover supporting structure, a cover material, an electronic display and a controller. The vehicle body structure defines an opening with a transparent material installed within the opening. The cover supporting structure is installed to the vehicle body structure adjacent to the opening. The cover material is supported to the cover supporting structure and is movable from a closed orientation covering the opening and the transparent material and an open orientation exposing the opening and the transparent material. The electronic display is installed to the cover material for movement therewith. The controller is configured to operate the display to display content thereon.

15 Claims, 8 Drawing Sheets

(56) References Cited

U.S. PATENT DOCUMENTS

| | | | | |
|---|---|---|---|---|
| 2004/0052037 A1* | 3/2004 | Sawyer | ............... | G06F 1/1601 361/679.05 |
| 2008/0272623 A1* | 11/2008 | Kadzban | ................... | B60J 7/00 296/216.01 |
| 2009/0210110 A1* | 8/2009 | Dybalski | ............... | B60K 35/00 701/31.4 |
| 2011/0042996 A1* | 2/2011 | Demma | ............... | B60J 1/2063 296/98 |
| 2012/0173069 A1 | 7/2012 | Tsimhoni et al. | | |
| 2012/0242698 A1* | 9/2012 | Haddick | ............ | G02B 27/0093 345/633 |
| 2014/0097636 A1* | 4/2014 | Snider | ...................... | B60J 1/001 296/97.8 |
| 2014/0347262 A1* | 11/2014 | Paek | ....................... | G09G 3/20 345/156 |
| 2015/0094897 A1 | 4/2015 | Cuddihy et al. | | |
| 2016/0250969 A1* | 9/2016 | Nania | ...................... | B60R 1/00 348/148 |

* cited by examiner

VEHICLE SHADE ASSEMBLY

BACKGROUND

Field of the Invention

The present invention generally relates to a vehicle shade assembly that includes an electronic display. More specifically, the present invention relates to a shade assembly with a cover that moves between an open orientation and a closed orientation, the cover having an electronic display that moves with the cover.

Background Information

Many vehicles include an electronic display either on an instrument panel within a passenger compartment of the vehicle, on a center console for viewing by rear seat passengers or extending down from an interior surface of a roof of the vehicle within the passenger compartment.

SUMMARY

One object of the present disclosure is to provide a vehicle opening covering shade assembly with a movable cover that includes a display configured to display data, camera captured images, videos and/or vehicle related data.

In view of the state of the known technology, one aspect of the present disclosure is to provide a vehicle shade assembly with a vehicle body structure, a cover supporting structure, a cover material, an electronic display and a controller. The vehicle body structure defines an opening with a transparent material installed within the opening. The cover supporting structure is installed to the vehicle body structure adjacent to the opening. The cover material is supported to the cover supporting structure and is movable from a closed orientation covering the opening and the transparent material and an open orientation exposing the opening and the transparent material. The electronic display is installed to the cover material for movement therewith. The controller is configured to operate the display to display content thereon.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
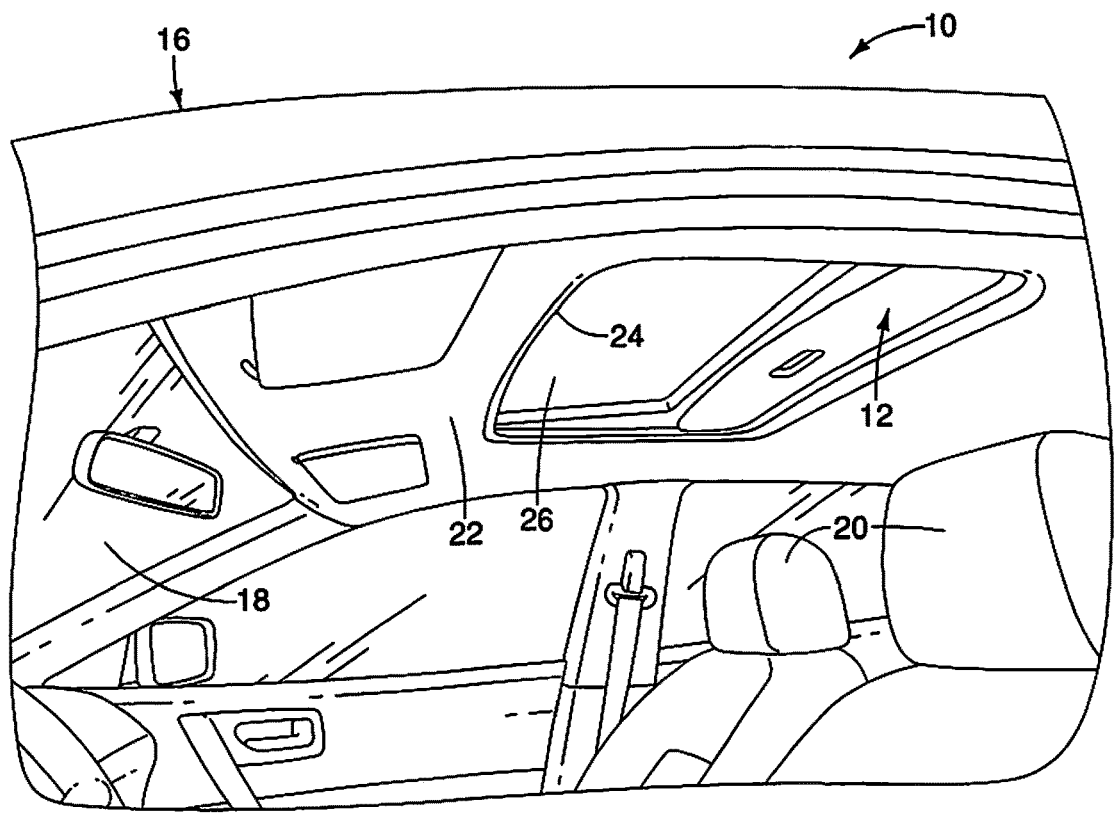
FIG. 1 is a perspective view of a portion of a passenger compartment of a vehicle having seats and a roof, the roof having a sunroof structure with a shade assembly and a movable cover that slides between an open orientation exposing glass or transparent material of the sunroof structure and a closed orientation covering the glass or transparent material, showing the cover in the open orientation in accordance with a first embodiment.
Figure 2:
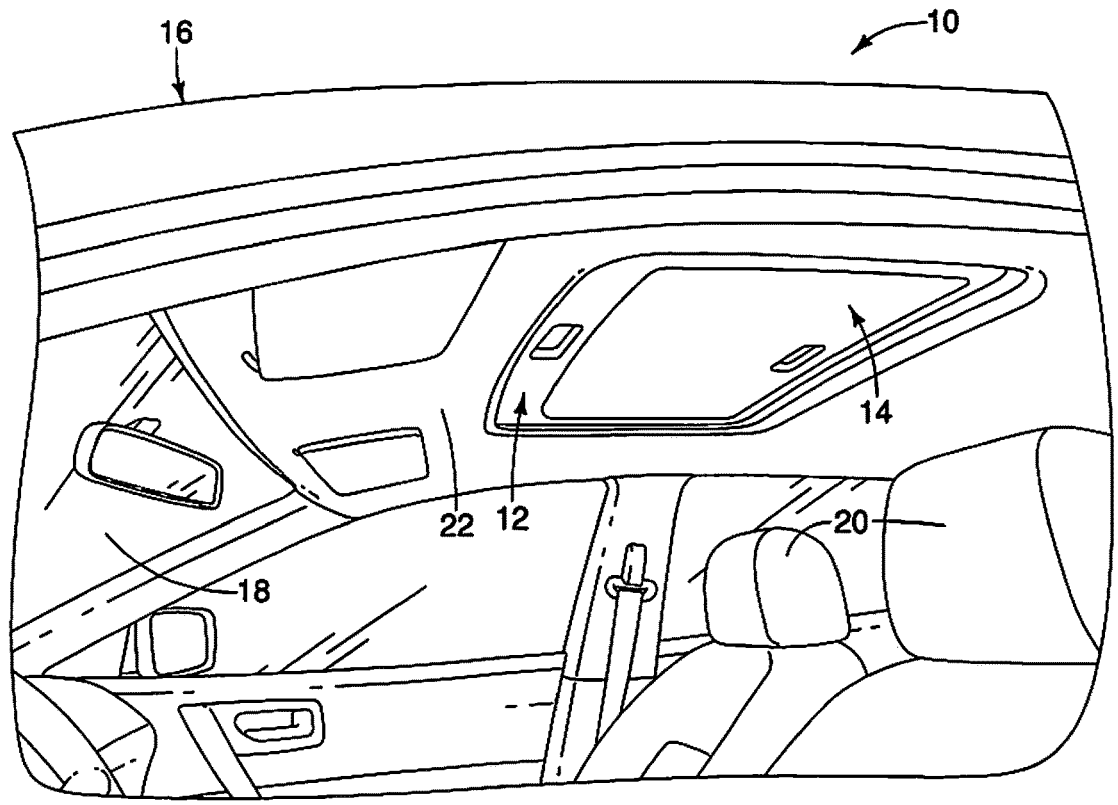
FIG. 2 is another perspective view of the portion of a passenger compartment shown in FIG. 1, showing the cover in the closed orientation in accordance with the first embodiment.

Referring initially to FIGS. 1 and 2, a vehicle 10 having a window shade assembly with a movable cover 12 that includes an electronic display 14 is illustrated in accordance with a first embodiment. As is described in greater detail below, the cover 12 and the electronic display 14 are movable between an open orientation concealing the electronic display 14, as shown in FIG. 1 and a closed orientation exposing the electronic display 14, as shown in FIG. 2. As is also explained in greater detail below, the electronic display 14 is configured to show various visual content, such as videos, camera captured images and vehicle related data.

The vehicle 10 includes a vehicle body structure 16 that defines a passenger compartment 18 with seats 20 and a roof 22, among other features. The roof 22 defines an opening 24 with glass 26 (a transparent material) installed within the opening 24. The opening 24 is horizontally oriented in approximate alignment with the contours of the roof 22. The opening 24 can define a sunroof, a moon roof, or other similar vehicle construct. The shape, size and orientation of the opening 24 can vary from vehicle to vehicle. In the depicted embodiment, the vehicle 10 is a four-door sedan with a generally horizontally oriented roof. However, it should be understood from the drawings and the description herein that the opening 24 (and the glass 26) is sized and shaped to conform to the overall design of the vehicle and is not limited to the relative size and shape of the opening 24 of the vehicle 10 as depicted in the first embodiment.

The glass 26 can be non-movably installed within the opening 24 via a fixed seal member(s) (not shown) in a conventional manner. Alternatively, the glass 26 can be installed to the opening 24 via a conventional hinge structure and/or a sliding structure such that the glass 26 is movable between a closed orientation and an open orientation in which air can flow in and out of the opening 24. Since window glass seal members, hinge structures and sliding structures for windows and/or sunroof structures are well known, further description is omitted for the sake of brevity.

Figure 3:
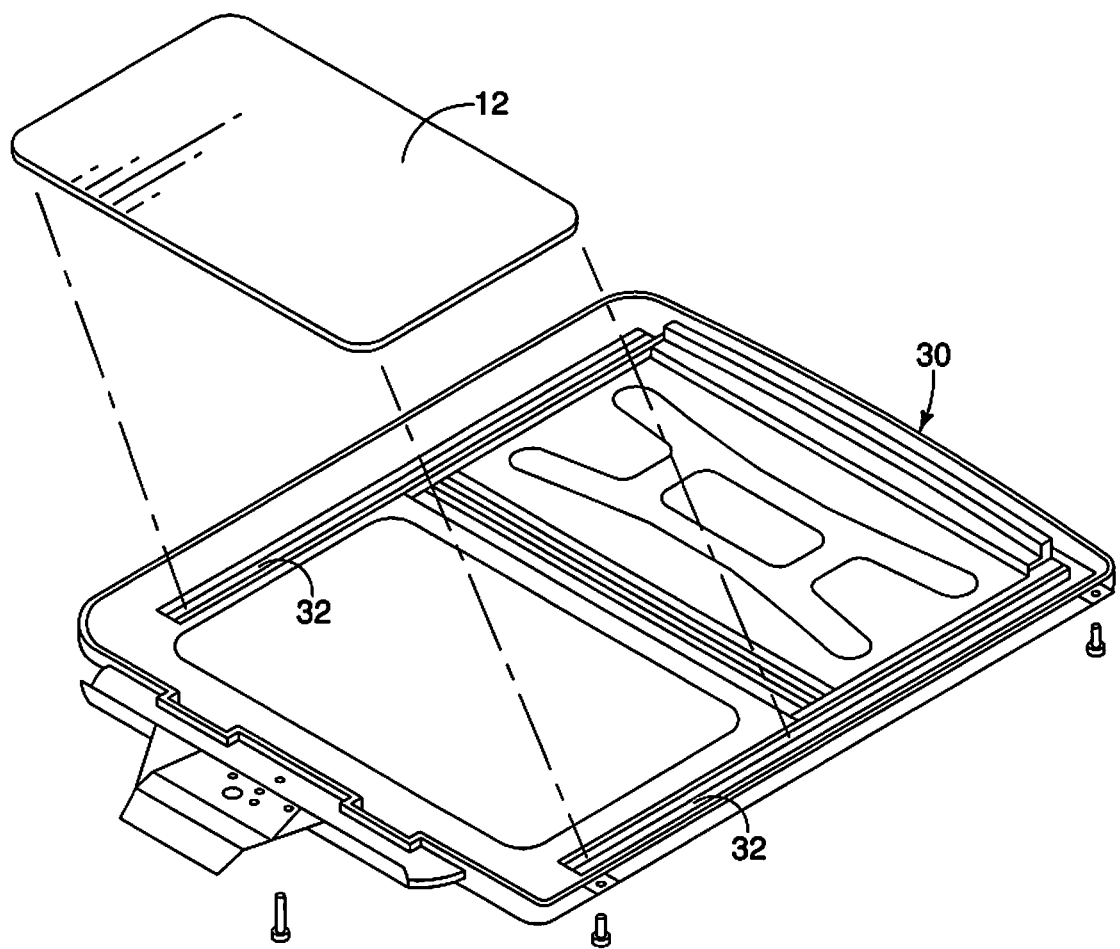
FIG. 3 is a perspective view of a cover supporting structure of the vehicle depicted in FIGS. 1 and 2, showing the cover and tracks of the cover supporting structure in accordance with the first embodiment.
Figure 4:
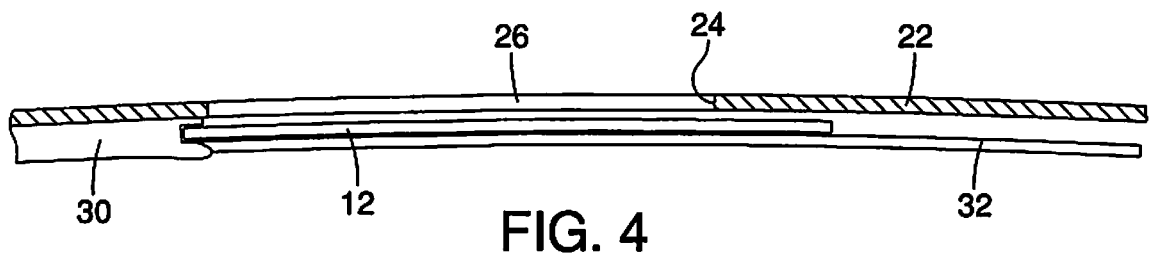
FIG. 4 is a cross-sectional side view of a portion of the roof of the vehicle depicted in FIGS. 1 and 2, showing the cover supporting structure fixed to the roof within the passenger compartment of the vehicle, showing the cover slide-ably engaged with the tracks of the cover supporting structure in accordance with the first embodiment.

In the first embodiment, the roof 22 of the vehicle 10 includes a cover supporting structure 30 that is shown removed from the vehicle 10 in FIG. 3. The cover supporting structure 30 is installed along an inner surface (underside surface) of the roof 22 of the vehicle body structure 16 surrounding the opening 24, as shown in FIG. 4. The cover supporting structure 30 includes a pair of tracks 32 that support and guide movement of the cover 12 between the open orientation (FIG. 1) and the closed orientation (FIG. 2). Since cover supporting structures, such as the cover supporting structure 30 are conventional structures, further description is omitted for the sake of brevity.

The cover 12 includes a cover material 36 and the electronic display 14. The cover material 36 is supported to the cover supporting structure 30. Specifically, as mentioned above, the cover 12 is movable along the tracks 32 from the closed orientation covering the opening 24 and the glass 26 (the transparent material) and the open orientation exposing the opening 24 and the glass 26. The cover material 36 can be made of a rigid material, such as plastic or polymer material, a composite material and/or a metallic material. The cover material 36 basically defines a rigid movable shade member. In the depicted embodiment, the cover material 36 is made of a material that prevents light from passing therethrough. Alternatively, the cover material 36 can be a transparent or translucent material that is either tinted or includes a layer that is switchable between having a tinted optical characteristic, and a non-tinted optical characteristic.

Figure 5:
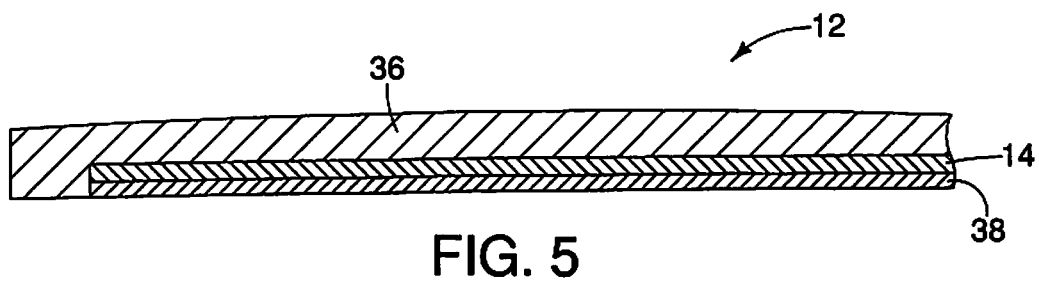
FIG. 5 is a cross-sectional side view of a portion of the cover showing the electronic display in accordance with the first embodiment.

As shown in cross-section in FIG. 5, the electronic display 14 is fixedly installed to the cover material 36 by, for example, mechanical fasteners (not shown) and/or an adhesive material. The electronic display 14 is a rigid display that is configured to display text, video and/or camera captured images, such as videos (movies), images captured by cameras installed to exterior surfaces of the vehicle 10, and/or vehicle related data, such as the data displayed by the various gauges and reads displayed on an instrument panel (not shown) of the vehicle 10. The electronic display 14, like the cover material 36, can be made of a material that prevents light from passing therethrough. Alternatively, the electronic display 14 can be a transparent or translucent layer that is either tinted or can include a layer that is electronically switchable by a controller 40 (described below) between having a tinted optical characteristic, and a non-tinted optical characteristic.

Figure 6:
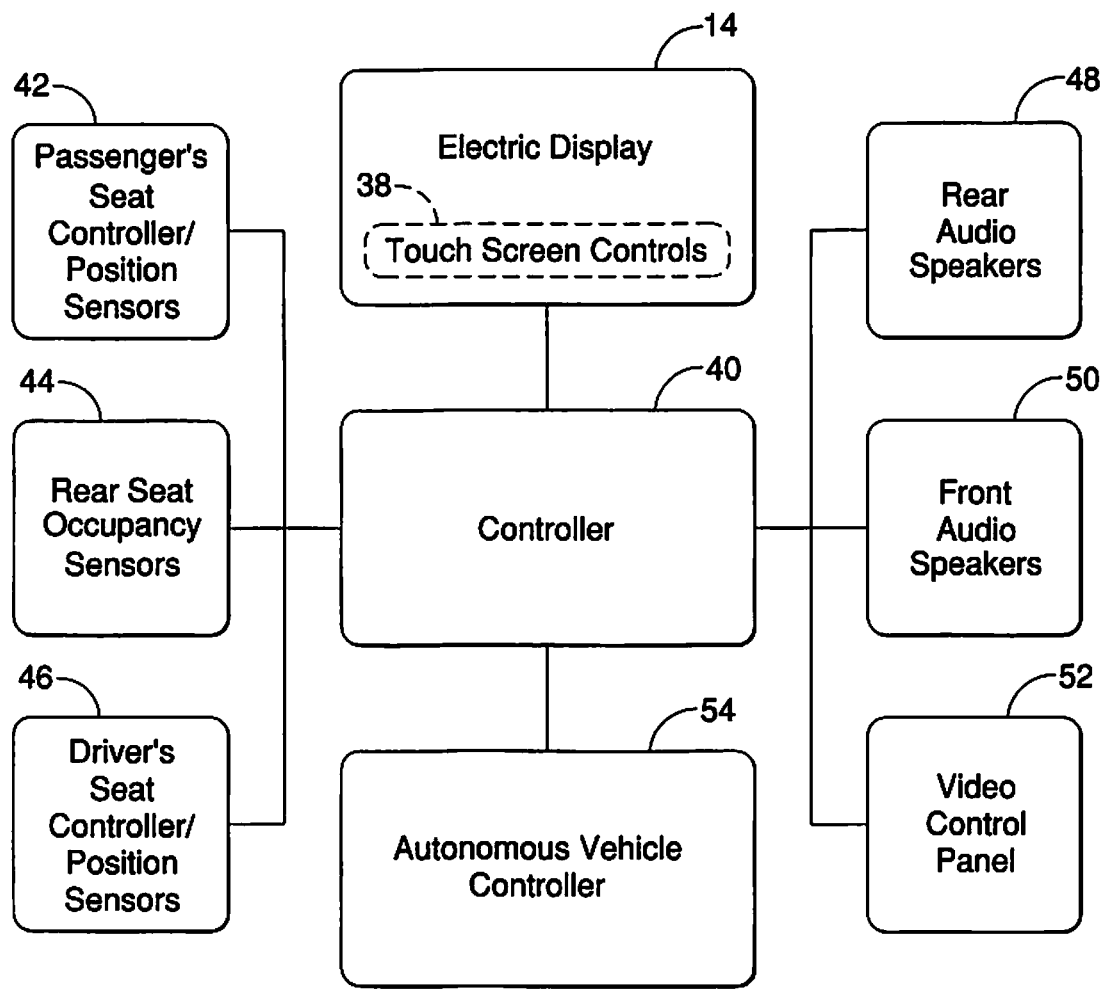
FIG. 6 is a block diagram showing a controller connected to the electronic display and various other devices and sensors within the vehicle in accordance with the first embodiment.

The electronic display 14 can include a rigid outer housing or can be a flexible display unit. In the first embodiment, the electronic display 14 is a rigid construct. Further, the electronic display 14 can include a touch sensitive layer 38 as shown in FIGS. 5 and 6, such that a passenger can touch the electronic display 14 in order to input instructions, operation commands and/or make video selections, enter data and/or make other inputs depending upon the configuration of the controller 40 (described below). The electronic display 14 can be hard wired to the controller 40 or can alternatively include a wireless communication device such as a WIFI (wireless) device and/or a BLUETOOTH® communication device. The wireless communication device can communicate with the controller 40, video devices within the vehicle 10 or a passenger's hand held device, such as a mobile phone, music player and/or video player.

The controller 40 is now described with specific reference to FIGS. 6-14. As shown in FIG. 6, the controller 40 is connected to the electronic display 14, a passenger's seat controller and/or position sensor(s) 42, rear seat occupancy sensor(s) 44, a driver's seat controller and/or position sensor(s) 46, rear audio speakers 48, front audio speakers 50, a video control panel 52 and an autonomous vehicle controller 54. The controller 40 can also be connected to a camera or cameras (not shown) installed to various exterior surfaces of the vehicle 10. Since such cameras are conventional vehicle features, further description is omitted for the sake of brevity.

Figure 7:
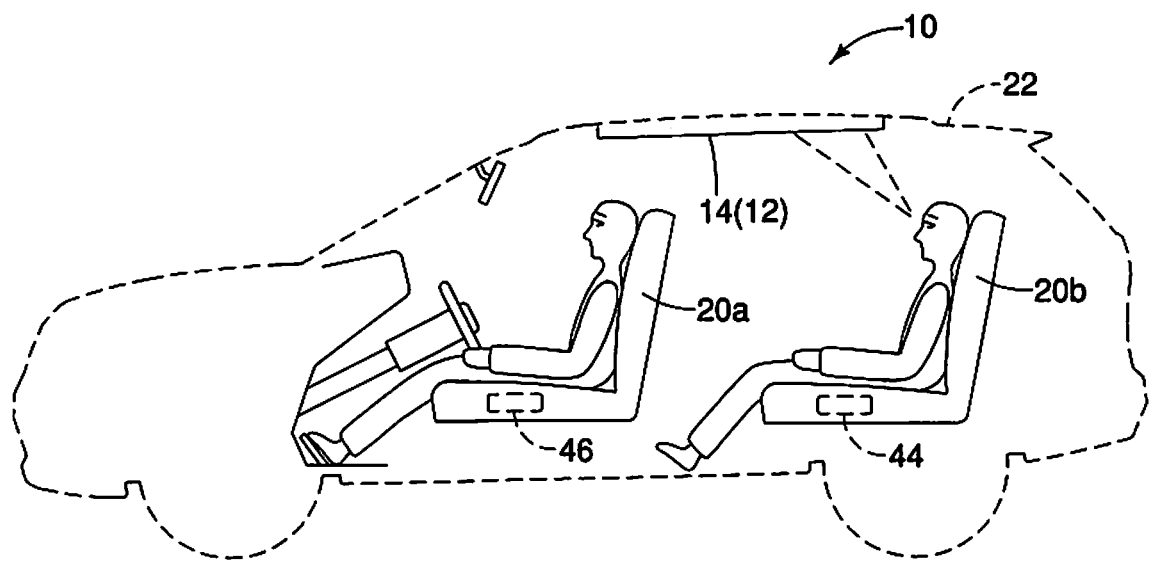
FIG. 7 is a side schematic view of a driver and a passenger seated within the vehicle showing the driver's seat in an upright orientation such that only the passenger (in a rear seat) is looking up at the electronic display in the cover in accordance with the first embodiment.
Figure 8:
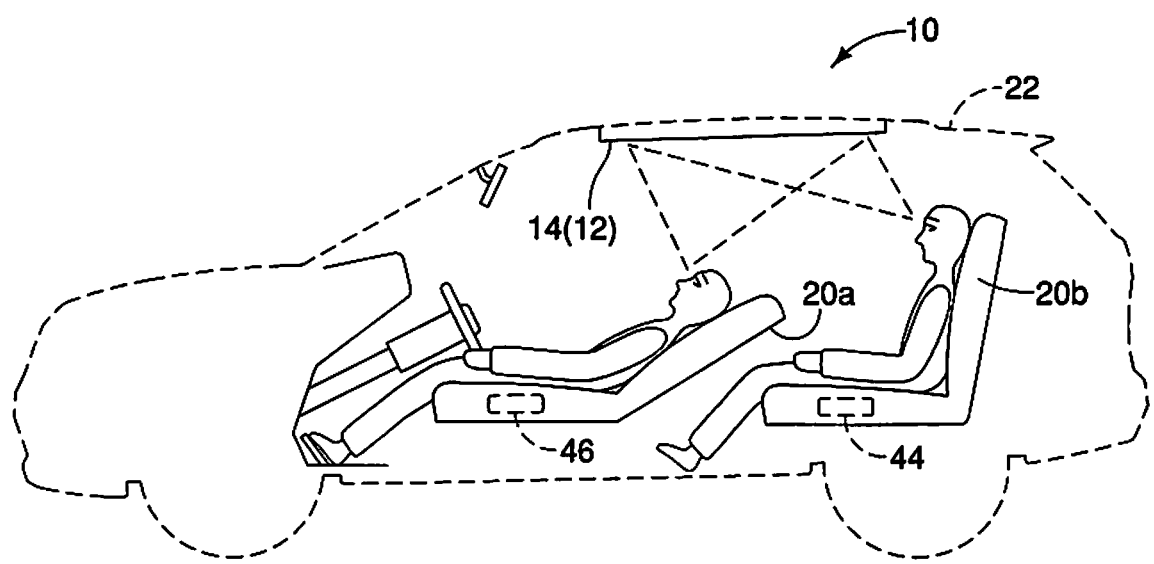
FIG. 8 is another side schematic view of the driver and the passenger showing the driver's seat in a reclined orientation such that both the driver and the passenger are looking up at the electronic display in the cover in accordance with the first embodiment.

The passenger's seat controller and/or position sensor(s) 42 is located within the passenger compartment 18 and is connected to a one of the seats 20 that corresponds to a front passenger's seat (not shown). Similarly, the driver's seat controller and/or position sensor(s) 46 also located within the passenger compartment 18 and is connected to another one of the seats 20 corresponding to a driver's seat 20a (FIGS. 7 and 8). The driver's seat 20a and passenger's seat of the seats 20 are configured to move between an upright orientation (FIG. 7) and a reclined orientation (FIG. 8). The passenger's seat controller and/or position sensor(s) 42 and the driver's seat controller and/or position sensor(s) 46 provide signals to the controller 40 indicating current orientations of the corresponding one of the seats 20 (upright orientation or reclined orientation, and in any of a plurality of forward/rearward positions). The rear seat occupancy sensors 44 are installed within a rear seat 20*b* and are configured to detect the presence of a passenger or passenger's seated therein.

The rear audio speakers 48 and the front audio speakers 50 are configured to provide sound from an audio system (not shown) within the vehicle 10. However, when the controller 40 operates the electronic display 14 to display a video or other image(s) that have corresponding audio, the controller 40 provides the corresponding audio to the rear audio speakers 48 and the front audio speakers 50. For example, if video content (a movie, a TV show or the like) is being shown in the electronic display 14 by the controller 40, and corresponding audio includes separation of audio signals in stereo and/or surround sound, the controller 40 provides the appropriate audio signal to each of the rear audio speakers 48 and the front audio speakers 50. In other words, the controller 40 is configured to provide audio signals to each of the rear audio speakers 48 and the front audio speakers 50 corresponding to video content displayed on the electronic display 14 including separate and unique audio signals to each of the rear audio speakers 48 and the front audio speakers 50 (the plurality of speakers).

The video control panel 52 can be on the instrument panel within the passenger compartment 18 of the vehicle 10 or located on a center console (not shown) between the driver's seat and the passenger's seat. Alternatively, or additionally, the video control panel 52 can be displayed on the electronic display 14, with selections by a passenger or driver being inputted via contact with the touch sensitive layer 38 of the electronic display 14. The video control panel 52 and the touch sensitive layer 38 are in electronic communication with the controller 40 such that selections or inputs made by a passenger or driver inputted via the video control panel 52 or the touch sensitive layer 38 cause the controller 40 to display a video content selection, such as a movie or a TV show, vehicle related date, or camera captured images on the electronic display 14. The video content can be stored within memory of the controller 40, or can be on storage media connected to or inputted into the video control panel 52 and/or the controller 40. For example, one or the other of the video control panel 52 and/or the controller 40 can include a DVD or CD player, a USB port and/or wireless connection capability such as a WIFI (wireless) device and/or a BLUETOOTH® communication device. The DVD or CD player can include the video content fed to the controller 40 and thereby displayed on the electronic display 14. Further, a passenger or driver can have a wireless device with video transmitting capability and provide video content therefrom to one or the wireless communication devices. The controller 40 receives and processes such received video data and can display it on the electronic display 14.

The controller 40 is configured to operate the display to display video content thereon at any of a plurality of displaying locations of the electronic display 14, where the displaying locations are defined by differing areas, or portions of the electronic display 14, as shown in FIGS. 9-14. In FIGS. 9-14 the roof 22 and features of the vehicle 10 are omitted for the sake of clarity.

Figure 9:
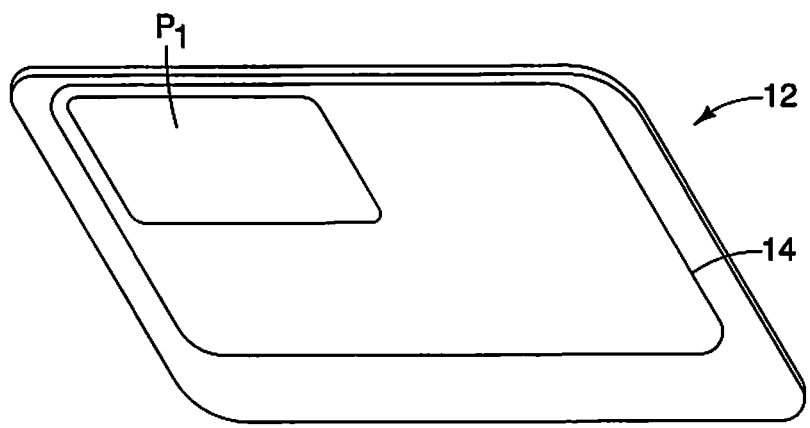
FIG. 9 is a perspective view of the cover removed from the vehicle with video content being displayed by the controller on the electronic display in a first position that is oriented for viewing by a passenger in the front seat next to the driver, with the passenger's seat being reclined in accordance with the first embodiment.

Specifically, in FIG. 9 is a perspective view of the cover 12 showing a first position $P_1$ of the electronic display 14 being provided with video content by the controller 40. The first position $P_1$ corresponds to a location above a front passenger's seat such that a passenger in the front seat of the seats 20 next to the driver's seat 20*a* can view video content with the passenger's seat being in a reclined orientation. In other words, in FIG. 9, the video content is displayed by the controller 40 in the first position $P_1$ for the sole benefit of the front seat passenger, not the driver or passengers in the rear seat 20*b*.

Figure 10:
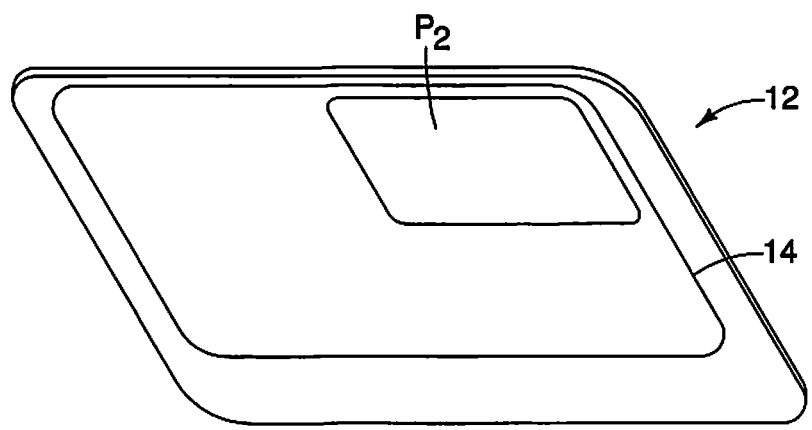
FIG. 10 is another perspective view of the cover with video content being displayed by the controller on the electronic display in a second position that is oriented for viewing by the driver in the driver's seat with the driver's seat being reclined in accordance with the first embodiment.

FIG. 10 is another perspective view of the cover 12 with video content being displayed on the electronic display 14 by the controller 40 in a second position $P_1$ that is oriented for viewing by the driver in the driver's seat 20*a* with the driver's seat 20*a* being reclined as shown in FIG. 8. The second position $P_2$ corresponds to a location above a front driver's seat 20*a* such that the driver can view video content with the driver's seat 20*a* being in the reclined orientation (FIG. 8). In other words, in FIG. 10, the video content is displayed by the controller 40 in the second position $P_2$ for the sole benefit of the driver, not passengers in the vehicle 10.

Figure 11:
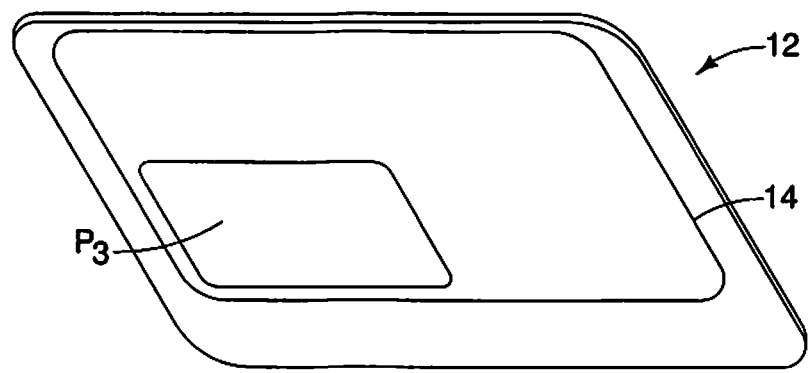
FIG. 11 is another perspective view of the cover with video content being displayed by the controller on the electronic display in a third position that is oriented for viewing by a passenger seated at a right-hand side of the rear seat in accordance with the first embodiment.

FIG. 11 shows video content being displayed by the controller 40 on the electronic display 14 in a third position $P_3$ that is located for viewing by a passenger seated in the rear seat 20*b* behind the passenger (at a right-hand side of the rear seat 20*b*).

Figure 12:
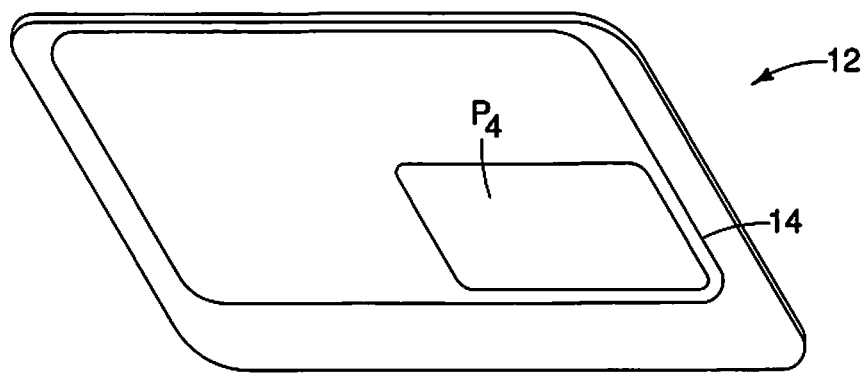
FIG. 12 is another perspective view of the cover with video content being displayed by the controller on the electronic display in a fourth position that is oriented for viewing by a passenger seated at a left-hand side of the rear seat in accordance with the first embodiment.

FIG. 12 shows video content being displayed by the controller 40 on the electronic display 14 in a fourth position $P_4$ that is oriented for viewing by a passenger seated in the rear seat 20*b* behind the driver (at a left-hand side of the rear seat 20*b*).

Figure 13:
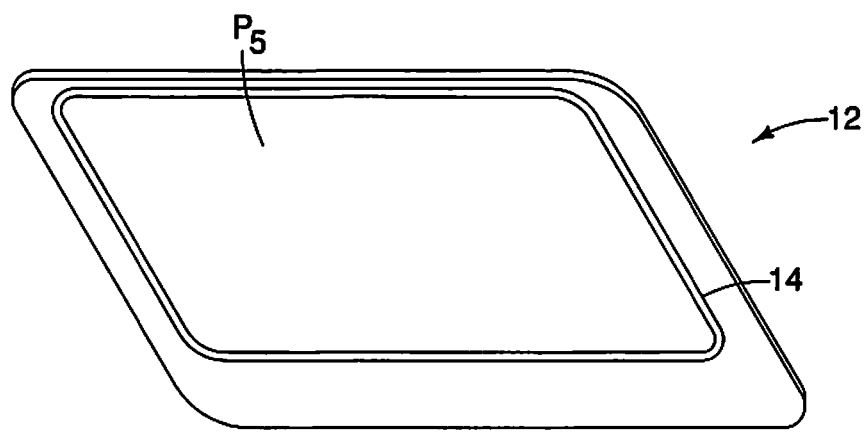
FIG. 13 is another perspective view of the cover with video content being displayed by the controller on the electronic display in a fifth position that utilizes all of the viewable area of the electronic display such that all passengers and the driver within the vehicle can view the video content in accordance with the first embodiment.

FIG. 13 shows video content being displayed by the controller 40 on the electronic display 14 in a fifth position $P_5$ that is oriented and dimensioned for viewing by the passengers seated in the rear seat 20*b*, a passenger in the front seat and the driver seated in the driver's seat 20*a*. Specifically, in the fifth position $P_5$ the entire electronic display 14 is used to display video content.

Figure 14:
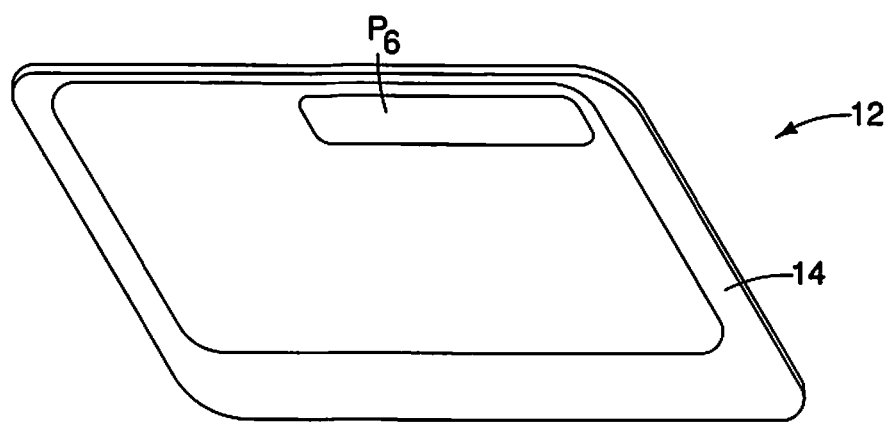
FIG. 14 is another perspective view of the cover with vehicle related data being displayed by the controller on the electronic display for viewing by the driver seated in the driver's seat in accordance with the first embodiment.

FIG. 14 shows vehicle related data being displayed by the controller 40 on the electronic display 14 in a sixth position $P_6$ that is oriented and dimensioned for viewing by the driver seated in the driver's seat 20*a* with the driver's seat 20*a* in the reclined orientation shown in FIG. 8. Specifically, in the sixth position $P_6$ the electronic display 14 displays vehicle related data overlaying video content displayed on the electronic display 14, or can pre-empt displayed video content in order to provide the driver with information relating to operation of the vehicle 10.

The controller 40 is configured to display the video content at any of the plurality of display locations $P_1$ through $P_6$ of the electronic display 14 in response to input selections made by any one of the vehicle occupants. Further, the controller 40 can automatically display video content at any one of the display locations $P_1$ through $P_6$ based upon signals received from the above described seat sensors. For example, if the driver is operating the vehicle 10, and the driver's seat 20*a* is in the upright orientation depicted in FIG. 7, then there is no need to display video content on the electronic display 14 for the benefit of the driver. The controller 40 is configured to determine this condition and select an appropriate one of the display locations $P_1$, $P_3$, through $P_5$ depending upon the presence (the occupancy) and location of passengers in the seats 20. More specifically, the controller 40 is configured to automatically position the video content to a portion or portions of the electronic display 14 in response to determining an orientation and position of the at least one of the driver's seat 20*a* and the front passenger seat adjacent to the driver's seat 20*a*.

As mentioned above, the controller 40 is connected to an autonomous vehicle controller 54. The controller 40 can be used in any type of vehicle, whether autonomous or non-autonomous. In the depicted embodiments, the vehicle 10 is an autonomous vehicle that includes the autonomous vehicle controller 54. The autonomous vehicle controller 54 is configured to automatically drive the vehicle 10 under specific circumstances without direct interaction from the driver in the vehicle 10. Examples of autonomous vehicle systems and corresponding controllers can be found in, for example, U.S. Pat. Nos. 9,248,819, 9,184,778, 9,244,462, 9,404,761, and 9,507,345, all assigned to Nissan North America Inc. The entire contents of each of U.S. Pat. Nos. 9,248,819, 9,184,778, 9,244,462, 9,404,761, and 9,507,345 are incorporated herein by reference in their entirety.

The controller 40 is configured to communicate with the autonomous vehicle controller 54. Specifically, in response to the autonomous vehicle controller 54 requiring the driver to take over control of the vehicle 10, the controller 40 displays such information to the electronic display 14 in the display location PG, thereby notifying the driver of the determination made by the autonomous vehicle controller 54.

Second Embodiment

Figure 15:
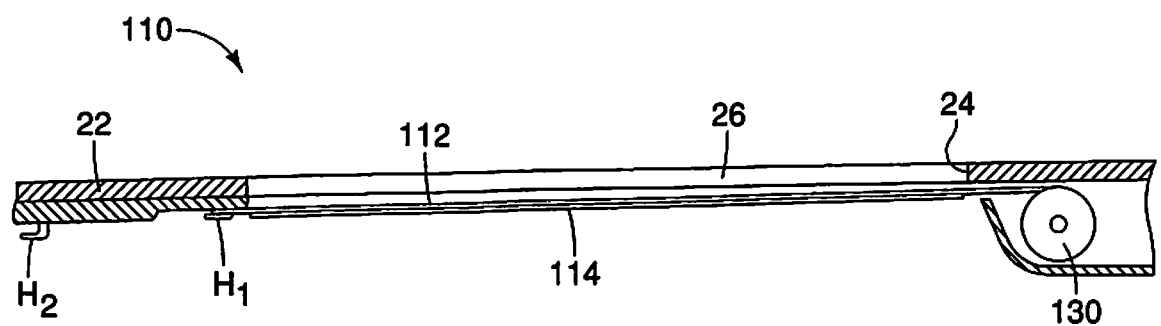
FIG. 15 is a cross-sectional side view of a portion of a roof of a vehicle showing a flexible cover with a flexible electronic display and cover supporting structure fixed to the roof within a passenger compartment of the vehicle, showing the cover in a first closed orientation in accordance with a second embodiment.
Figure 16:
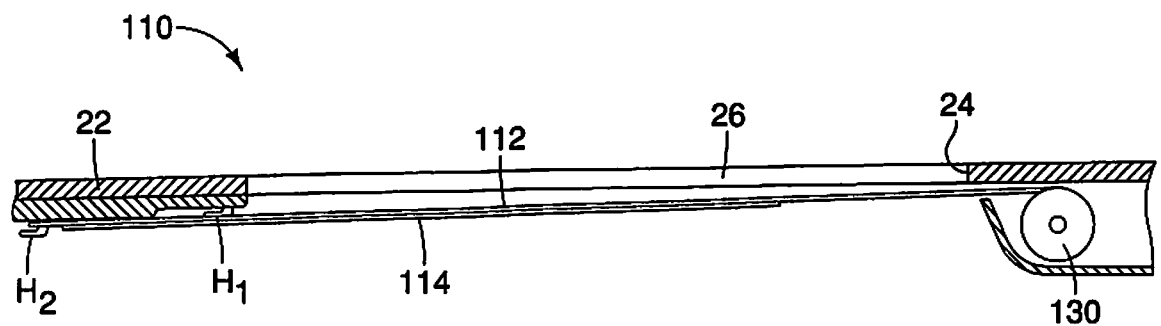
FIG. 16 is a cross-sectional side view of the portion of the roof of the vehicle depicted in FIG. 15, showing the flexible cover and flexible electronic display in a second closed orientation in accordance with the second embodiment.

Referring now to FIGS. 15 and 16, a vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle 110 includes the roof 22, the opening 24 in the roof 22 and the glass 26 (transparent material) installed into the opening 24, as described above with respect to the first embodiment. The vehicle 112 further includes a cover 112 having an electronic display 114 and a cover support structure 130 fixedly attached to the roof 22. In the second embodiment, the cover 112 includes a flexible cover material that basically defines a rollup shade member. The cover support structure 130 includes a conventional spring biased rollup mechanism attached to the cover 112 (the rollup shade member). The cover support structure 130 and the cover 112 are configured such that the cover 112 wraps around a roller within the cover support structure 130 when the cover 112 is in an open or retracted orientation (not shown), and is drawn out of the cover support structure 130 in order to cover the opening 24 when in closed orientations (FIGS. 15 and 16). The spring biasing of the cover support structure 130 urges the cover 112 to move to the open or retracted orientation.

The electronic display 114 is a flexible display that is fixedly attached to the flexible cover material of the cover 112 for movement therewith via, for example, an adhesive material. More specifically, the electronic display 114 can roll-up within the cover support structure 130 along with the cover 112.

An interior surface of the roof 22 includes a first hook $H_1$ and a second hook $H_2$, that are spaced apart from one another. The first hook $H_1$ is located adjacent to a front end of the opening 24. The second hook $H_2$ is spaced apart from the first hook $H_1$ and is located forward of the first hook $H_1$ in a vehicle longitudinal direction. As shown in FIG. 15, the cover 112 (the flexible cover) and the electronic display 114 (the flexible electronic display) can be secured to the roof 22 in a first closed orientation by hooking a distal end of the cover 112 to the first hook $H_1$. In the first closed orientation, the cover 112 completely covers the opening 24 with at least a front end of the electronic display 114 being approximately aligned with a front end of the opening 24.

As shown in FIG. 16, the cover 112 and the electronic display 114 can be secured to the roof 22 in a second closed orientation by hooking the distal end of the cover 112 to the second hook $H_2$. In the second closed orientation, the cover 112 completely covers the opening 24 but causes the front end of the electronic display 114 to be located forward of the front end of the opening 24. Thus, the display locations $P_1$ through $P_6$ are all positioned at a more forward set of locations, as compared to the first closed orientation shown in FIG. 15.

The electronic display 114 is in electronic communication with the controller 40 and has all the capabilities and functions of the electronic display 14 of the first embodiment as described above with respect to the controller 40.

Third Embodiment

Figure 17:
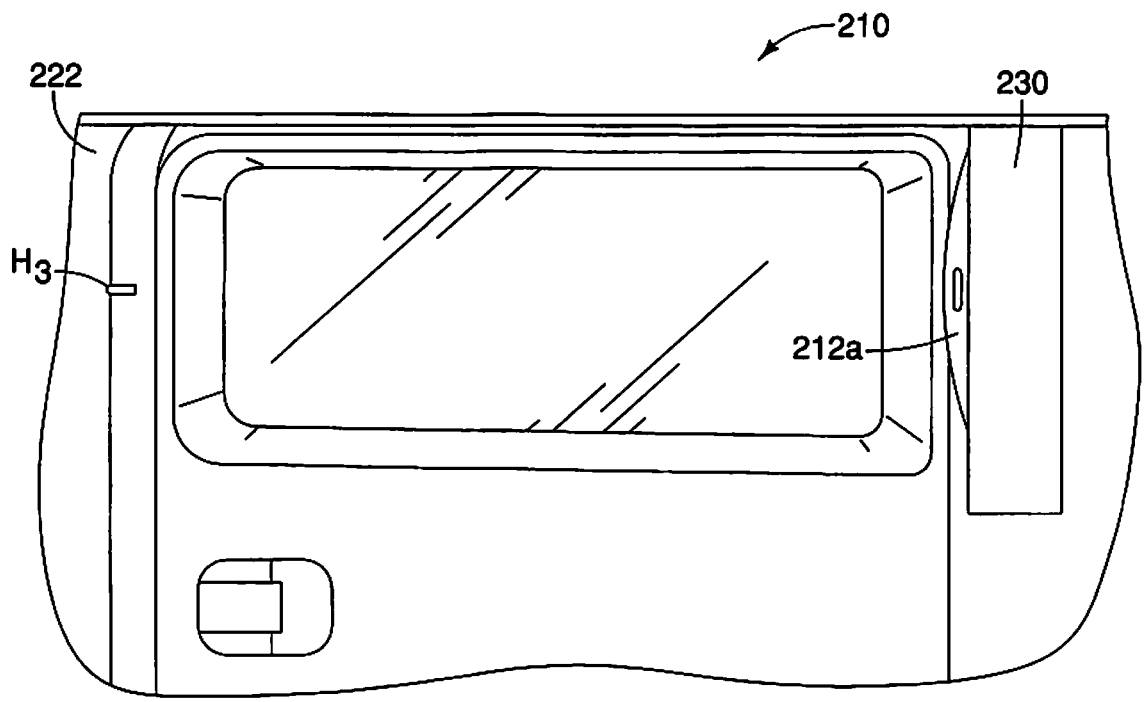
FIG. 17 is a side view of a passenger compartment of a vehicle having side wall structure with a flexible cover with a flexible electronic display and cover supporting structure fixed to the side wall structure, showing the cover in an open orientation exposing a window in accordance with a third embodiment.
Figure 18:
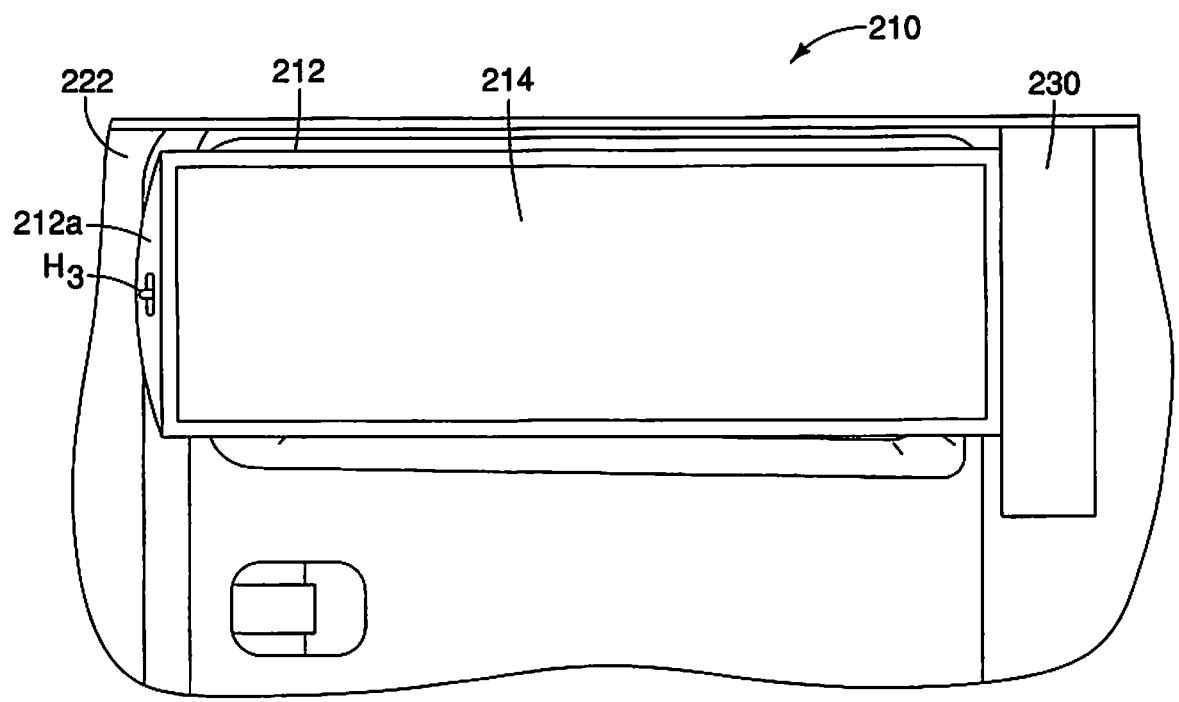
FIG. 18 is another side view of the passenger compartment and the side wall structure depicted in FIG. 17, showing the cover in a closed orientation covering the window and exposing the electronic display in accordance with the third embodiment.

Referring now to FIGS. 17 and 18, a vehicle 210 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vehicle 210 includes the side wall structure 222 (a vehicle side portion) that defines an opening 224 with glass (transparent material) installed into the opening 224. The side wall structure 222 can be a fixed side wall of the vehicle 210, or alternatively, the side wall structure 222 can define a door that can move between an open position and a closed position with the opening 224 being defined within the door of the side wall structure 222.

The vehicle 212 further includes a cover 212 having an electronic display 214 fixed thereto and a cover support structure 230 fixed to the side wall structure 222. In the third embodiment, the cover 212 includes a flexible cover material that basically defines a rollup shade member. The cover support structure 230 includes a conventional spring biased rollup mechanism attached to the cover 212 (the rollup shade member). The cover support structure 230 and the cover 212 are configured such that the cover 212 wraps around a roller within the cover support structure 230 when the cover 212 is in an open or retracted orientation shown in FIG. 17, and is drawn out of the cover support structure 130 in order to cover the opening 24 when in closed orientation shown in FIG. 18. The spring biasing of the cover support structure 230 urges the cover 212 to move to the open or retracted orientation.

The electronic display 214 is a flexible display that is fixedly attached to the flexible cover material of the cover 212 for movement therewith via, for example, an adhesive material. More specifically, the electronic display 214 can roll-up within the cover support structure 230 along with the cover 212.

An interior surface of the side wall structure 222 includes a hook $H_3$. The hook $H_3$ is located adjacent to a front end of the opening 224. As shown in FIG. 18, the cover 212 (the flexible cover) and the electronic display 214 (the flexible electronic display) can be secured to the side wall structure 222 in a closed orientation by hooking a distal end of the cover 212 to the hook $H_3$. In the closed orientation, the cover 212 completely covers the opening 224.

The electronic display 214 is in electronic communication with the controller 40 and has all the capabilities and functions of the electronic display 14 of the first embodiment as described above with respect to the controller 40. Specifically, the electronic display 214 can be operated by the controller 40 to put video content in each of the display locations $P_1$ through $P_6$ of the electronic display 214.

The controller 40 preferably includes a microcomputer with an electronic display control program that controls the electronic displays 14, 114 and 214. The controller 40 can also include other conventional components such as an input interface circuit, an output interface circuit, and storage devices such as a ROM (Read Only Memory) device and a RAM (Random Access Memory) device. The microcomputer of the controller 40 can be programmed to control the electronic displays 14, 114 and 214. The internal RAM of the controller 40 stores statuses of operational flags and various control data. The internal ROM of the controller 40 stores the operational logic for the various display operations. It will be apparent to those skilled in the art from this disclosure that the precise structure and algorithms for the controller 40 can be any combination of hardware and software that will carry out the functions of the present invention.

The vehicle 10 includes many features and structures that are conventional components that are well known in the art. Since such vehicle features and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle shade assembly. Accordingly, these terms, as utilized to describe the present invention should be interpreted relative to a vehicle equipped with the vehicle shade assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle shade assembly, comprising:
a vehicle body structure defining an opening with a transparent material installed within the opening, and includes a first hook located forward of the opening and a second hook located forward of the first hook;
a cover supporting structure installed to the vehicle body structure adjacent to the opening;
a cover material supported to the cover supporting structure, the cover material defining a rollup shade member and the cover supporting structure includes a rollup mechanism attached to the rollup shade member, the cover material being movable from a first closed orientation covering the opening and the transparent material to an open orientation exposing the opening and the transparent material and the cover material being movable from a second closed orientation covering the opening and the transparent material to the open orientation exposing the opening and the transparent material, such that the forward end of the cover material hooks to the first hook in the first closed orientation, the cover material hooks to the second hook in the second closed orientation and the cover material is rearward of and spaced apart from both the first hook and the second hook in the open orientation;
an electronic display installed to the cover material for rollup movement therewith, the electronic display being a flexible display; and
a controller configured to operate the electronic display to display content thereon.

2. The vehicle shade assembly according to claim 1, wherein
the vehicle body structure includes a roof portion with the opening being horizontally oriented along the roof portion.

3. The vehicle shade assembly according to claim 1, wherein
the electronic display includes a touch sensitive layer.

4. The vehicle shade assembly according to claim 1, wherein
the electronic display is either transparent or translucent.

5. The vehicle shade assembly according to claim 1, wherein
the electronic display includes an electronically controlled tinting layer.

6. The vehicle shade assembly according to claim 1, further comprising:
a passenger detection feature connected to the controller of the electronic display, and
the controller is configured to display the content at any of a plurality of displaying locations of the display where the displaying locations are defined by differing portions of the display.

7. The vehicle shade assembly according to claim 1, further comprising:
a control panel connected to the controller such that a vehicle occupant can input selections to the control panel, and
the controller is configured to display the content at any of a plurality of displaying locations of the display in response to input selections made by the vehicle occupant.

8. The vehicle shade assembly according to claim 1, further comprising:
at least one seat installed within a passenger compartment defined by the vehicle body structure, the seat being adjustable to a plurality of differing orientations and positions, including a forward position, a rearward position, and a plurality of reclined orientations, and
the controller is configured to automatically position the content to a portion or portions of the electronic display in response to determining an orientation and position of the at least one seat.

9. The vehicle shade assembly according to claim 1, further comprising:
a plurality of seats installed within a passenger compartment defined by the vehicle body structure, each of the plurality of seats having a corresponding occupancy sensor, and
the controller is configured to automatically position the content to a portion or portions of the electronic display in response to determining occupancy of each of the plurality of seats.

10. The vehicle shade assembly according to claim 1, wherein
the content displayed on the electronic display by the controller includes at least one of an entertainment video, vehicle status information from an instrument panel within the vehicle body structure and images captured by a camera installed to an exterior of the vehicle body structure.

11. The vehicle shade assembly according to claim 1, wherein
the electronic display includes a wireless communication device in communication with the controller.

12. The vehicle shade assembly according to claim 1, wherein
the vehicle body structure defines a passenger compartment having a plurality of audio speakers connected to the controller, and
the controller is configured to provide audio signals to the audio speakers corresponding to the content including separate and unique audio signals to each of the plurality of speakers.

13. The vehicle shade assembly according to claim 1, wherein
with the cover in the first closed orientation a front end of the electronic display is approximately aligned with a front end of the opening, and with the cover in the second closed orientation a front end of the electronic display is located forward of the front end of the opening.

14. A vehicle shade assembly, comprising:
a vehicle body structure defining an opening with a transparent material installed within the opening;
a cover supporting structure installed to the vehicle body structure adjacent to the opening;
a cover material supported to the cover supporting structure, the cover material defining a rollup shade member and the cover supporting structure includes a rollup mechanism attached to the rollup shade member, the cover material being movable from a first closed orientation covering the opening and the transparent material to an open orientation exposing the opening and the transparent material and the cover material being movable from a second closed orientation covering the opening and the transparent material to the open orientation exposing the opening and the transparent material;
a flexible electronic display installed to the cover material for rollup movement therewith; and
a controller configured to operate the flexible electronic display to display content thereon.

15. The vehicle shade assembly according to claim 14, wherein
the vehicle body structure includes a first hook located forward of the opening and a second hook located forward of the first hook, and
the forward end of the cover material hooks to the first hook in the first closed orientation, the cover material hooks to the second hook in the second closed orientation and the cover material is rearward of and spaced apart from both the first hook and the second hook in the open orientation.

* * * * *